May 21, 1940.　　M. BRAMSON ET AL　　2,201,222
BATTER DROPPER
Filed Jan. 5, 1939
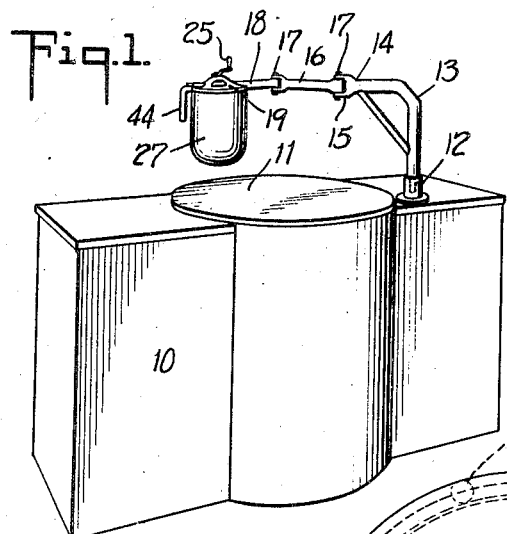
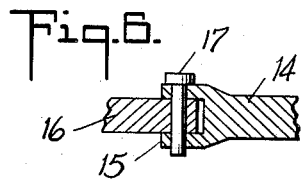
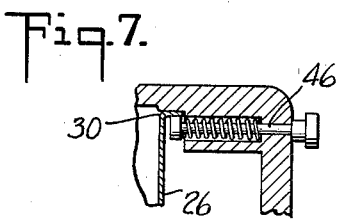
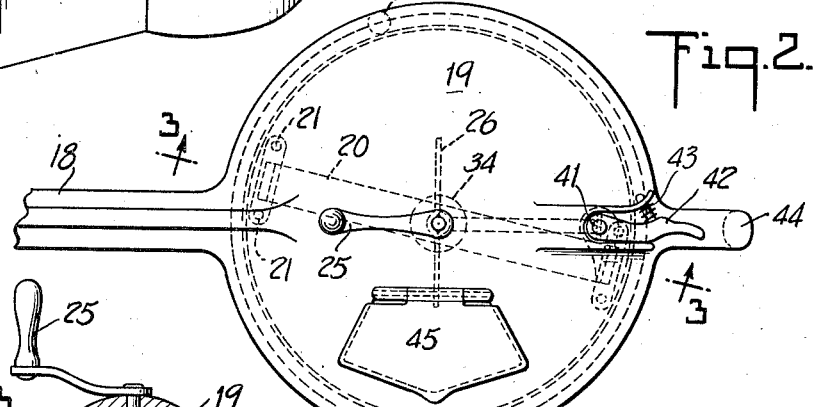
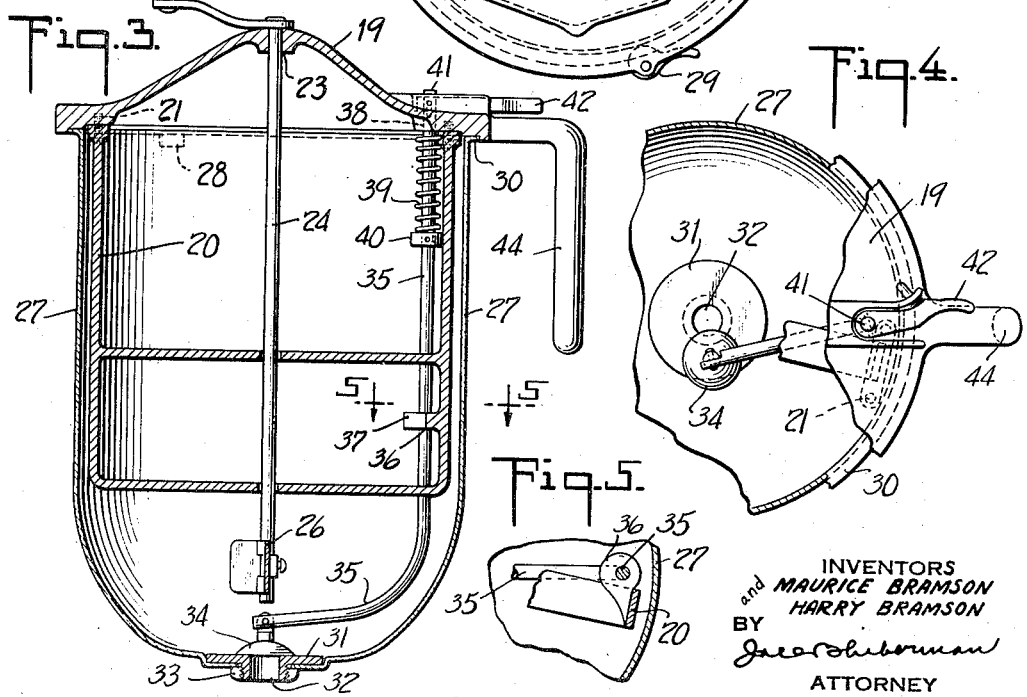
INVENTORS
MAURICE BRAMSON
and HARRY BRAMSON
BY
ATTORNEY Patented May 21, 1940

2,201,222

UNITED STATES PATENT OFFICE 2,201,222

BATTER DROPPER

Maurice Bramson and Harry Bramson, Brooklyn, N. Y.

Application January 5, 1939, Serial No. 249,378

4 Claims. (Cl. 259—43)

The present invention relates to batter droppers, and is more particularly directed toward devices suitable for dropping pancake or other batters on to a hot plate for cooking.

The present invention contemplates a device for this purpose adapted to be suitably mounted to one side of the hot plate and having supports so that a batter container can be swung about to place it over any selected spot on the hot plate or griddle.

According to the present invention the batter container is detachably mounted so that it can be readily removed for cleaning, and provisions are made for stirring the contents of the container and for releasing the desired amount of liquid so that it can drop on to the hot plate.

The accompanying drawing shows, for purposes of illustrating the present invention, one of the many embodiments in which the invention may take form (together with modifications of certain parts), it being understood that the drawing is illustrative of the invention rather than limiting the same.

In the drawing:

Figure 1 is a perspective view of a pancake baking machine in which the present invention is applied;

Figure 2 is a top plan view of the arm and cover for the batter container and showing the batter container in dotted lines;

Figure 3 is a vertical sectional view taken on the line 3—3 of Figure 2;

Figure 4 is a fragmentary top plan view with parts broken away;

Figure 5 is a fragmentary sectional view on the line 5—5 of Figure 3;

Figure 6 is a fragmentary sectional view of a detail; and

Figure 7 is a fragmentary sectional view of a modified form of construction.

As shown in the drawing the pancake baking machine utilizes a suitable cabinet 10 adapted to be below the working level, and this cabinet supports a hot plate 11. At the side the cabinet carries a bearing member 12 for a bracket arm 13, the end 14 of this bracket arm is bifurcated, as indicated at 15, Figure 6, and to receive a link 16 held in place by a removable pin 17. The link 16 similarly carries an arm 18 which is preferably integral with a round cover member 19.

The lower face of the cover member supports a U-shaped frame 20 which may be secured to it by screws indicated at 21. The U-shaped frame and cover provide bearings at 22 and 23 for a vertical stirrer rod 24 extending downwardly and provided with a handle 25 at the top and blades 26 at the bottom.

A liquid container 27 slightly larger in diameter than the U-shaped stamping is fitted to the bottom of the cover 19 and is held in place by a lug 28 at one side and an eccentric 29 at the other side, these elements engaging a flange 30 at the top of the liquid container. The bottom of the container is provided with an opening to receive a flanged bushing 31 having a central opening 32 and a lock nut 33. The upper face of this bushing is preferably ground smooth so as to cooperate with a closure member 34 carried on the end of a rod 35 which extends up through a hole 36 in a lug 37 carried by the U-shaped frame and through a hole 38 provided in the cover. The rod 35 is pressed down by a spring 39 interposed between the cover and a collar 40. The upper end 41 of the rod 35 is pinned to a thumbpiece 42 which is urged to the position shown in Figure 2 by a small spring 43. When it is in this position the closure member 34 is over the opening 32 and the escape of batter is prevented. When the thumbpiece is pushed to the position shown in Figure 4, the opening is uncovered so that the batter can drop out on to the hot plate. This thumbpiece is placed close to a suitable handle 44 extending downwardly from the cover casting 19 to facilitate manipulating the device. The cover has a hinged door 45 to facilitate filling the container with batter.

In the modification shown in Figure 7 the lip or flange 30 of the batter container is held in place by a spring pressed plunger 46.

The device can be readily taken apart for cleaning. To do this the pin 17 between the parts 16 and 18 is removed and the entire device can be taken from the restaurant into the kitchen. The batter container can be readily removed and the entire device thoroughly washed. The device presents a neat appearance, and is particularly well adapted for use in the window of the restaurant to attract customers.

It is obvious that the invention may be embodied in many forms and constructions within the scope of the claims and we wish it to be understood that the particular form shown is but one of the many forms. Various modifications and changes being possible, we do not otherwise limit ourselves in any way with respect thereto.

What is claimed is:

1. A device of the class described comprising an arm, a cover member carried by the end of the arm, a U-shaped frame secured to the lower face of the cover member, a liquid container detachably secured to the cover member and enclosing the U-shaped member, the container being apertured at the bottom, a stirrer carried by the cover member and the U-shaped member, a rod extending down through the cover, and inside the container adjacent the container wall, and carrying a closure member, bearings in the cover and in the U-shaped member for the rod, a lever carried by the rod for shifting the rod about its axis, and a spring biasing the rod to a position to keep the closure member above the opening to prevent escape of the contents of the container.

2. A device of the class described comprising an arm, a cover member carried by the end of the arm, a U-shaped frame secured to the lower face of the cover member, a liquid container detachably secured to the cover member and enclosing the U-shaped member, the container being apertured at the bottom, a stirrer carried by the cover member and the U-shaped member, a rod extending down through the cover, and inside the container adjacent the container wall, and carrying a closure member, bearings in the cover and in the U-shaped member for the rod, a lever carried by the rod for shifting the rod about its axis, a spring biasing the rod to a position to keep the closure member above the opening to prevent escape of the contents of the container, and a spring pressing the rod down to hold the closure on the bottom of the container.

3. A device of the class described comprising an arm, a cover member carried by the end of the arm, a U-shaped frame secured to the lower face of the cover member and enclosing the U-shaped member, a liquid container detachably secured to the cover member, the container being apertured at the bottom, a stirrer carried by the cover member and the U-shaped member, a rod extending down through the cover, and inside the container adjacent the container wall, and carrying a closure member, bearings in the cover and in the U-shaped member for the rod adjacent the cover for shifting the rod about its axis, a spring biasing the rod to a position to keep the closure member above the opening to prevent escape of the contents of the container, and a handle extending downwardly adjacent the lever so that one can manipulate the lever while grasping the handle for swinging the device about the pivot.

4. A device of the class described comprising a liquid container having a centrally disposed bottom aperture and an upper peripheral flange, a relatively fixed cover having a fixed flange engaging element and a movable flange engaging element, a U-shaped frame below the cover and adapted to act as a guide to direct the container toward said elements when raised toward the cover, a stirrer supported by the cover and frame, and a cover carried closure device pivoted in a vertical axis adjacent the container wall and shiftable to open or close the aperture.

MAURICE BRAMSON.
HARRY BRAMSON.